(12) United States Patent
Miura et al.

(10) Patent No.: US 11,934,003 B2
(45) Date of Patent: Mar. 19, 2024

(54) PLANAR LIGHT SOURCE

(71) Applicant: NICHIA CORPORATION, Anan (JP)

(72) Inventors: Yukihiro Miura, Tokushima (JP);
Masaaki Katsumata, Anan (JP);
Ryohei Yamashita, Tokushima (JP);
Takashi Matsuo, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/872,598

(22) Filed: Jul. 25, 2022

(65) Prior Publication Data

US 2023/0030292 A1 Feb. 2, 2023

(30) Foreign Application Priority Data

Jul. 28, 2021 (JP) ................................. 2021-123012

(51) Int. Cl.
*F21V 8/00* (2006.01)

(52) U.S. Cl.
CPC ......... *G02B 6/0088* (2013.01); *G02B 6/0016* (2013.01); *G02B 6/0043* (2013.01); *G02B 6/0085* (2013.01)

(58) Field of Classification Search
CPC .................................................. G02B 6/0088
See application file for complete search history.

(56) References Cited

U.S. PATENT DOCUMENTS

| | | | | |
|---|---|---|---|---|
| 2011/0051043 A1* | 3/2011 | Kim | ..................... | H01L 25/0753 349/64 |
| 2015/0146113 A1* | 5/2015 | Kasai | ................... | G02B 6/0073 348/794 |
| 2015/0369467 A1* | 12/2015 | Saito | ..................... | H05K 3/0011 362/345 |
| 2016/0092011 A1* | 3/2016 | Kong | ..................... | G06F 3/045 345/174 |
| 2018/0212129 A1* | 7/2018 | Saito | ........................ | H05K 1/02 |
| 2019/0041683 A1* | 2/2019 | Jo | ............................. | C09J 11/08 |
| 2019/0281705 A1* | 9/2019 | Hanya | .................. | H05K 3/1283 |
| 2020/0057190 A1 | 2/2020 | Daikoku | | |
| 2020/0379165 A1 | 12/2020 | Hayashi | | |
| 2021/0036050 A1 | 2/2021 | Hiraide | | |
| 2021/0036198 A1* | 2/2021 | Nakabayashi | .......... | H01L 33/44 |

(Continued)

FOREIGN PATENT DOCUMENTS

| | | |
|---|---|---|
| JP | 2010-232252 A | 10/2010 |
| JP | 2020-013714 A | 1/2020 |
| JP | 2020-027778 A | 2/2020 |

(Continued)

*Primary Examiner* — Sang V Nguyen

(74) *Attorney, Agent, or Firm* — Foley & Lardner LLP

(57) ABSTRACT

A planar light source includes: a support member; a light guide member disposed on the support member and having a light source positioning part; and a light source disposed on the support member while being in the light source positioning part of the light guide member. The support member includes: an insulation base having a first face positioned closer to the light source and a second face positioned opposite the first face, a first conductive layer disposed on the first face of the insulation base and electrically connected to the light source, an adhesive layer disposed on and in contact with the first face of the insulation base and the first conductive layer, and a light reflecting sheet disposed on the adhesive layer.

20 Claims, 10 Drawing Sheets

(56) References Cited

U.S. PATENT DOCUMENTS

2022/0235913 A1\* 7/2022 Lee .................... F21S 43/31

FOREIGN PATENT DOCUMENTS

| JP | 2020-198421 A | 12/2020 |
| JP | 2021-027128 A | 2/2021 |
| JP | 2021-027129 A | 2/2021 |
| JP | 2021-106277 A | 7/2021 |
| JP | 2021-170623 A | 10/2021 |
| KR | 10-2020-0139615 A | 12/2020 |
| WO | WO-2015/059967 A1 | 4/2015 |
| WO | WO-2016/017673 A1 | 2/2016 |
| WO | WO-2017/098910 A1 | 6/2017 |

\* cited by examiner

PLANAR LIGHT SOURCE

CROSS-REFERENCE TO RELATED APPLICATION

This application claims priority to Japanese Patent Application No. 2021-123012, filed on Jul. 28, 2021, the disclosure of which is hereby incorporated by reference in its entirety.

BACKGROUND

The present disclosure relates to a planar light source.

A light emitting module in which a light emitting element such as a light emitting diode and a light guide plate are combined is widely utilized as a planar light source such as a backlight of a liquid crystal display. See, for example, Japanese Patent Publication No. 2020-13714.

SUMMARY

One object of embodiments of the present disclosure is to provide a planar light source with which thickness reduction can be achieved.

A planar light source according to one embodiment of the present disclosure includes a support member, a light guide member disposed on the support member and having a light source positioning part, and a light source disposed on the support member while being in the light source positioning part of the light guide member. The support member includes an insulation base having a first face positioned closer to the light source and a second face positioned opposite the first face, a first conductive layer disposed on the first face of the insulation base and electrically connected to the light source, an adhesive layer disposed on the first face of the insulation base and the first conductive layer and in contact with the first face of the insulation base and the first conductive layer, and a light reflecting sheet disposed on the adhesive layer.

A planar light source according to an embodiment of the present disclosure can facilitate reduction in thickness.

DETAILED DESCRIPTION

Figure 1:
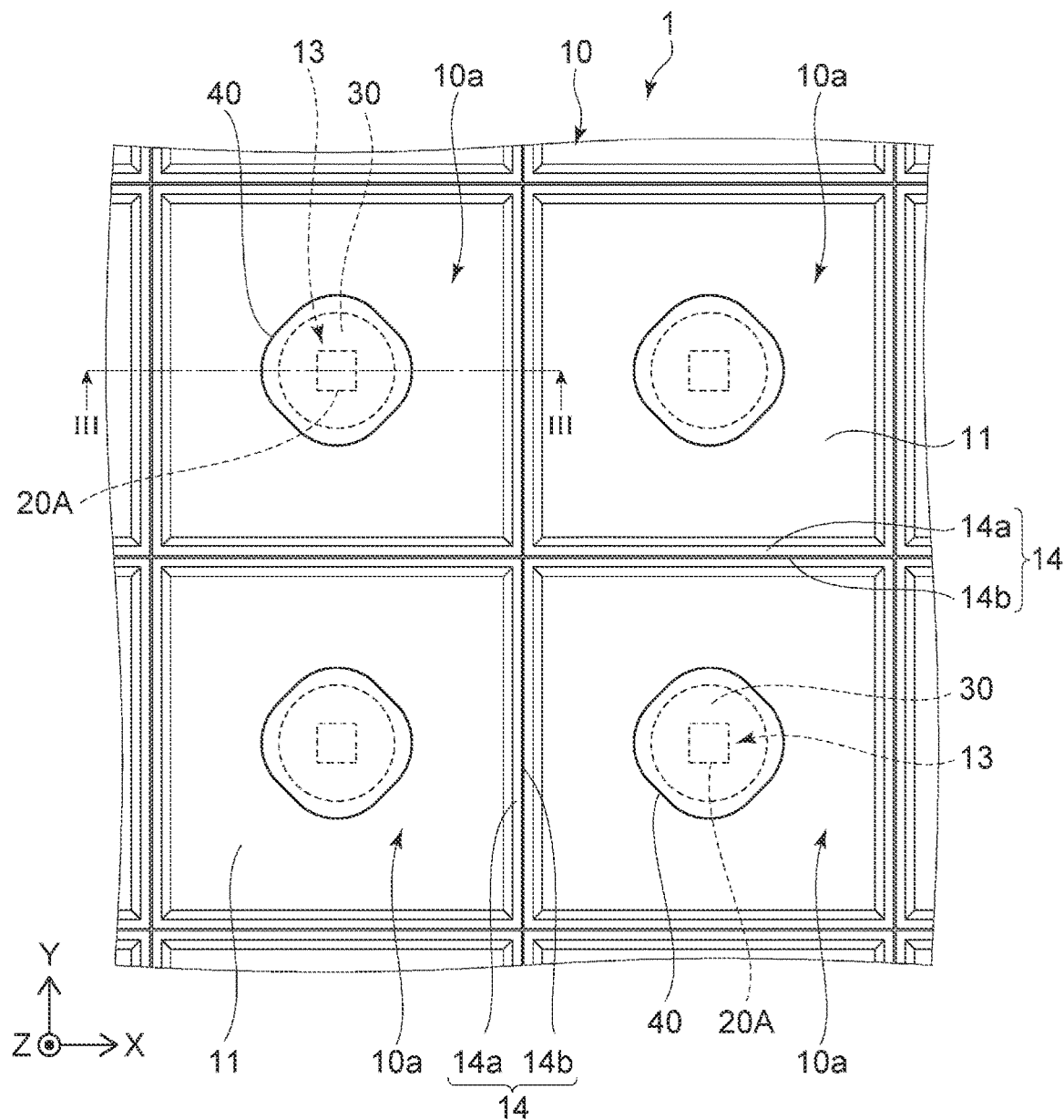
FIG. 1 is a top view of a planar light source according to a First Embodiment.

Certain embodiments of the present disclosure will be explained below with reference to the accompanying drawings. The drawings are schematic representations of the embodiments. As such, the scale, spacing, or positional relationships of the members might be exaggerated, or a certain portion of a member omitted. An end face view showing only a cut section might be used as a cross-sectional view.

In the description below, the constituent elements having practically the same functions are denoted by common reference numerals for which a repeated explanation may be omitted. Furthermore, terms indicating specific directions or positions (e.g., "upper," "lower," and other terms including or related to these) might be used. These terms, however, are merely used in order to make the embodiments in the drawings being referenced more easily understood. As long as the relationship between relative directions or positions indicated with the terms such as "upper," "lower," or the like is the same as those in a referenced drawing, the layout of the elements in other drawings, or actual products outside of the present disclosure, or the like, does not have to be the same as those shown in the referenced drawing. In the present disclosure, "parallel" includes not only cases in which two straight lines, sides, planes, or the like, never intersect even when extended, but also cases in which two straight lines, sides, planes, or the like intersect while forming an angle of up to 10°. Furthermore, the positional relationships of constituent elements expressed with the term "on" or the like include cases in which a constituent element is in contact with another, as well as cases in which a constituent element is positioned above another without being in contact.

First Embodiment

A planar light source 1 according to a First Embodiment will be explained with reference to FIG. 1 to FIG. 5D.

The planar light source 1 includes a light guide member 10, a light source 20A, a support member 50, a first light transmissive member 30, and a second light adjusting member 40.

Each element making up the planar light source 1 will be explained in detail below.

Light Guide Member

Figure 3:
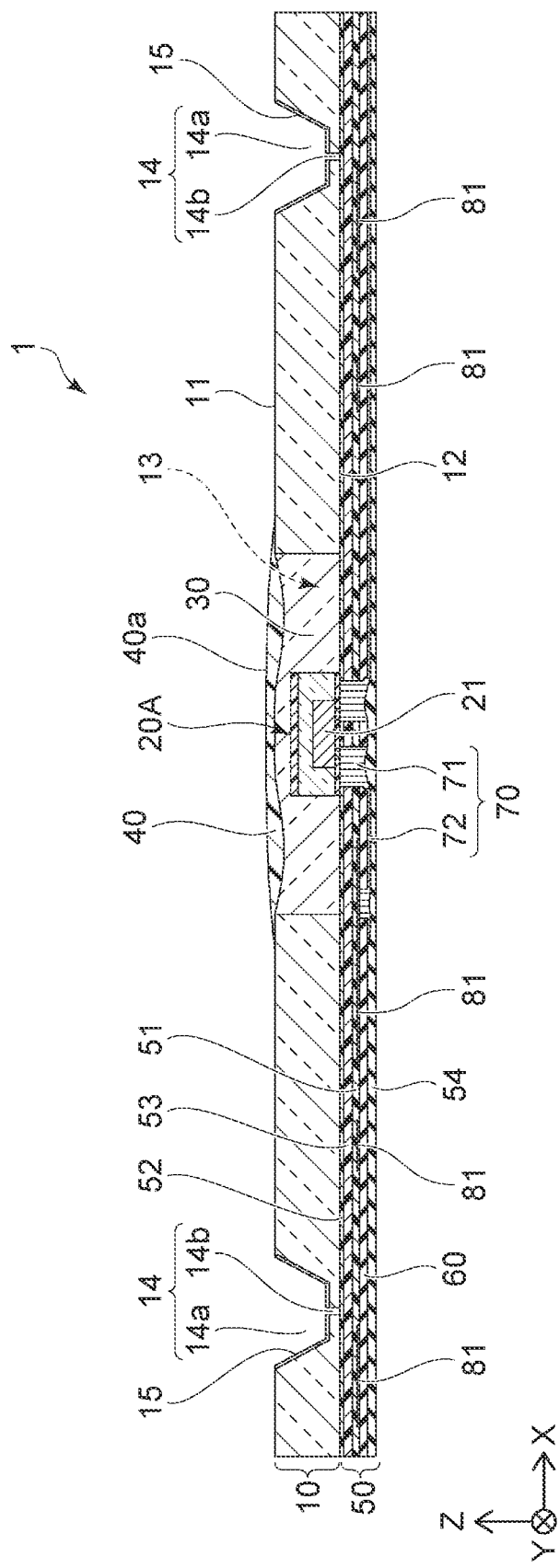
FIG. 3 is a cross-sectional view taken along line in FIG. 1.

As shown in FIG. 3, the light guide member 10 has a first upper face 11 and a first lower face 12 opposing the first upper face 11. In the present disclosure, the two directions parallel to the first upper face 11 of the light guide member 10 and orthogonal to one another are designated as the first direction X and the second direction Y. The direction from the first lower face 12 to the first upper face 11 orthogonal to the first direction X and the second direction Y is designated as the third direction Z.

As shown in FIG. 1, the light guide member 10 has a plurality of light guide parts 10a. The light guide parts 10a are separated from one another in the first direction X and the second direction Y by the grooves 14 described later. Each light guide part 10a can be a driving unit for local dimming, for example. The light guide member 10 does not have to be separated into multiple light guide parts 10a.

The light guide member 10 is a member having light transmissivity with respect to the light emitted by a light source 20A. The transmittance of the light guide member 10 with respect to the peak wavelength of the light from the light source 20A is preferably at least 50%, for example, more preferably at least 70%.

For the material for the light guide member 10, for example, a thermoplastic resin, such as acrylic, polycarbonate, cyclic polyolefin, polyethylene terephthalate, or polyester, a thermosetting resin, such as epoxy or silicone, or glass can be used.

The thickness of the light guide member 10 is preferably 150 μm to 800 μm, for example. In the present disclosure, the thickness of each member represents the maximum value of the distance between the upper face and the lower face of the member in the third direction Z. The light guide member 10 may have a single layer structure or a multilayer structure in the third direction Z. In the case in which the light guide member 10 has a multilayer structure, a light transmissive adhesive layer may be disposed between layers. The layers in the multilayer structure may employ different main component. For the material for the adhesive layer, for example, a thermoplastic resin, such as acrylic, polycarbonate, cyclic polyolefin, polyethylene terephthalate, or polyester, or a thermosetting resin, such as epoxy or silicone can be used.

The light guide member 10 has a light source positioning part 13. The light source positioning part 13 is a through hole that passes through from the first upper face 11 to the first lower face 12. The light source positioning part 13 may be a recess that is open on the first lower face 12 side. The light guide member 10 has a plurality of light source positioning parts 13. For example, a light source positioning part 13 is located in each of the light guide parts 10a. As shown in FIG. 1, each light source positioning part 13 can have, for example, a circular shape in a plan view. Each light source positioning part 13 can have an elliptical shape, or a polygonal shape, such as a triangular, quadrangular, hexagonal, or octagonal shape, in a plan view. In the present disclosure, a plan view means a view of an object in the third direction Z.

In the light guide member 10, grooves 14 that separate the light guide parts 10a from one another are formed. The grooves 14 can reduce warping of the planar light source attributable to the heat generated by the light sources 20A, for example. As shown in FIG. 1, in a plan view, the grooves 14 are elongated in the first direction X and the second direction Y. As shown in FIG. 3, the grooves 14 have first groove portions 14a open on the first upper face 11 side, and second groove portions 14b open on the first lower face 12 side. The first groove portions 14a and the second groove portions 14b are connected in the third direction Z. The width of a first groove portion 14a is larger than the width of a second groove portion 14b. The widths of the first groove portions 14a and the second groove portions 14b are the dimensions in the direction orthogonal to the direction in which the grooves 14 elongated.

As shown in FIG. 3, a partition member 15 can be disposed in each first groove portion 14a. The partition member 15 has light reflectivity with respect to the emitted light from the light sources 20A. The partition members 15 are resin members containing light scattering particles, for example. For the light scattering particles included in the partition members 15, for example, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used. For the resin material for the partition members 15, for example, a thermoplastic resin, such as an acrylic resin, polycarbonate resin, cyclic polyolefin resin, polyethylene terephthalate resin, or polyester resin, or a thermosetting resin, such as an epoxy resin or silicone resin can be used. The partition members 15 may be metal members, such as aluminum or silver. For example, the partition members 15 are disposed over the inner surfaces of the first groove portions 14a in the form of a film. The partition members 15 may fill the first groove portions 14a.

The partition members 15 reduce light being guided between adjacent light guide parts 10a. For example, the partition members 15 reduce light guided from a light guide part 10a in the lit state to an adjacent light guide part 10a in the unlit state. This can facilitate the luminance control per light guide part 10a when performing local dimming by using individual light guide parts 10a as driving units.

In FIG. 3, the grooves 14 go through from the first upper face 11 to the first lower face 12 of the light guide member 10. The grooves 14 may be those having bottoms, open on the first upper face 11 side and not reaching the first lower face 12. The grooves 14 may be those having bottoms, open on the first lower face 12 side and not reaching the first upper face 11. The grooves 14 may be hollow spaces created in the light guide member 10.

The light guide member 10 is disposed on the support member 50 so as to face the first lower face 12 to the upper face of the support member 50.

Light Source

A light source 20A is disposed in a light source positioning part 13 of the light guide member 10. Light sources 20A are disposed in corresponding light source positioning parts 13. The light sources 20A are preferably disposed in all of the light source positioning parts 13, but do not have to be. The light sources 20A are disposed on the support member 50 in the light source positioning parts 13.

The light source 20A includes a light emitting element 21. The light emitting element 21 includes a semiconductor stack structure. The semiconductor stack structure includes, for example, a sapphire or gallium nitride substrate, an n-type semiconductor layer disposed on the substrate, a p-type semiconductor layer, and an emission layer interposed between these layers. The light emitting element 21 includes an n-side electrode electrically connected to the n-type semiconductor layer and a p-side electrode electrically connected to the p-type semiconductor layer. Furthermore, the light source 20A includes a pair of positive and negative electrodes 25 disposed on the lower face side. One of the pair of electrodes 25 is electrically connected to the p-side electrode and the other is electrically connected to the n-side electrode.

A semiconductor stack structure from which the substrate is removed may be used. The emission layer may have a double heterostructure or single quantum well structure (SQW) having a single active layer, or a multiple quantum well structure (MQW) having a group of active layers. The emission layer can emit visible light or ultraviolet light. The emission layer can emit as visible light from blue to red light. The semiconductor stack structure which includes such an emission layer can include, for example, $In_xAl_y Ga_{1-x-y}N$ ($0 \leq x$, $0 \leq y$, $x+y \leq 1$). The semiconductor stack structure can include at least one emission layer capable of emitting the light described above. For example, the semiconductor stack structure may be a structure that includes one or more emission layers between an n-type semiconductor layer and a p-type semiconductor layer, or one that repeatedly stacks a structure which successively includes an n-type semiconductor layer, an emission layer, and a p-type semiconductor layer. In the case in which the semiconductor stack structure includes a plurality of emission layers, the emission layers may include those that emit light of different peak emission wavelengths or the same peak emission wavelength. The same peak emission wavelength may include variations of about several nanometers, for example. Such a combination of emission layers may be suitably selected, and in the case in which the semiconductor stack structure includes two emission layers, for example, the emission layers can be selected in combinations of blue light and blue light, green light and green light, red light and red light, ultraviolet light and ultraviolet light, blue light and green light, blue light and red light, green light and red light, and the like. The emission layer may include a plurality of active layers emitting light of different peak emission wavelengths, or a plurality of active layers emitting light of the same peak emission wavelength.

Figure 4:
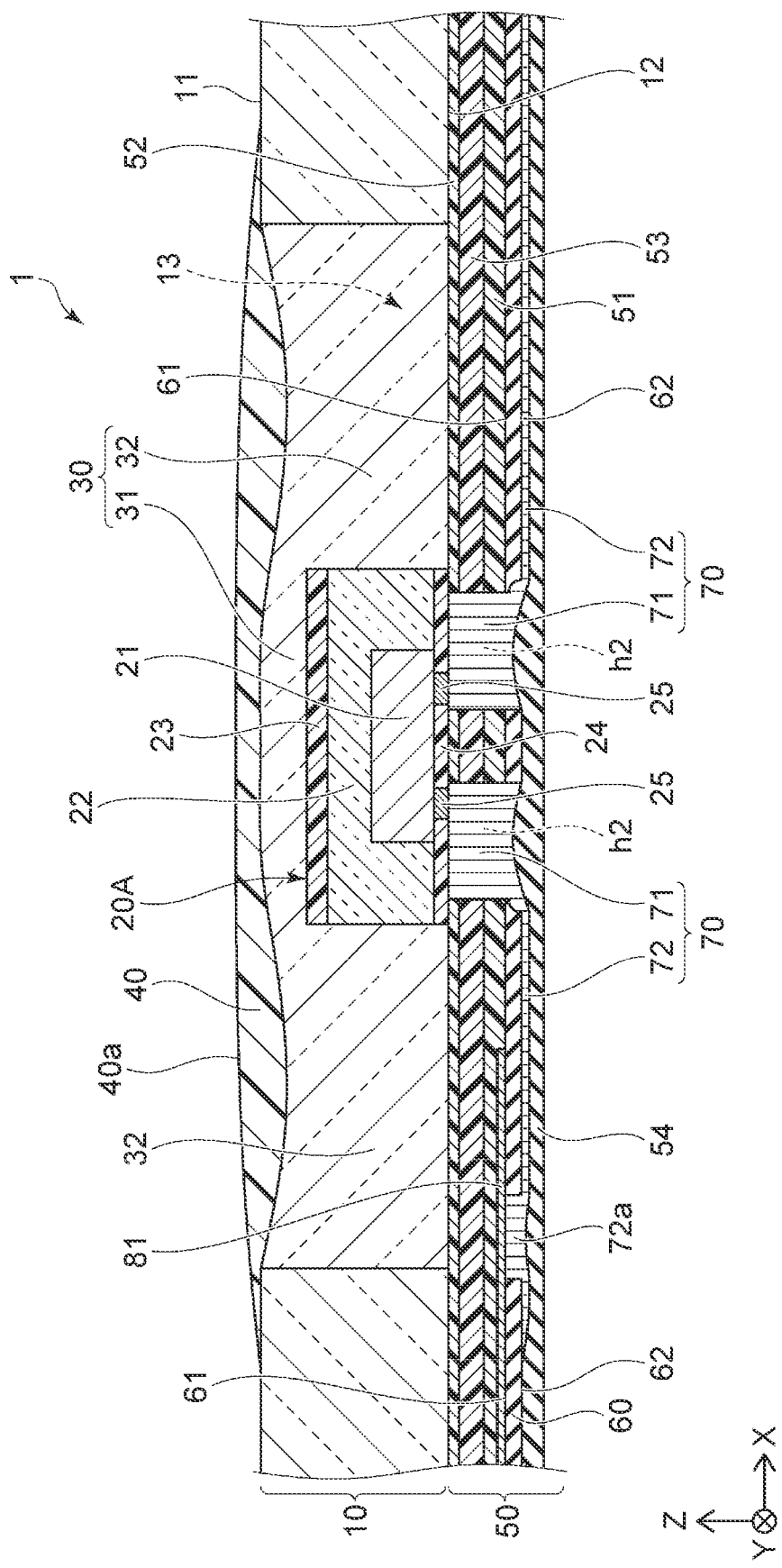
FIG. 4 is a cross-sectional view of the light source positioning part and the peripheral area in FIG. 3.
Figure 5:
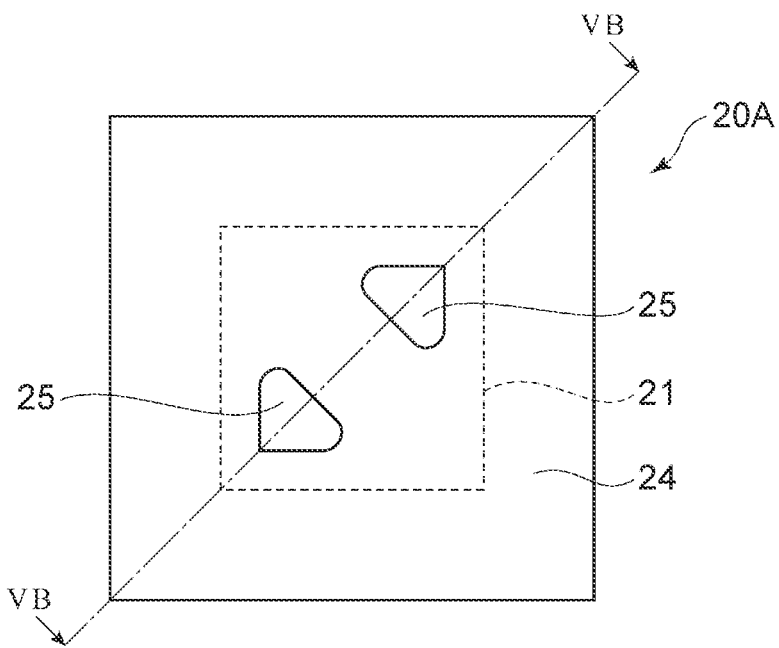
FIG. 5A is a bottom view of a light source in the embodiments.
FIG. 5B is a cross-sectional view taken along line VB-VB in FIG. 5A.
FIG. 5C is a cross-sectional view of a variation of the light source in the embodiments.
FIG. 5D is a cross-sectional view of a variation of the light source in the embodiments.
Figure 5:
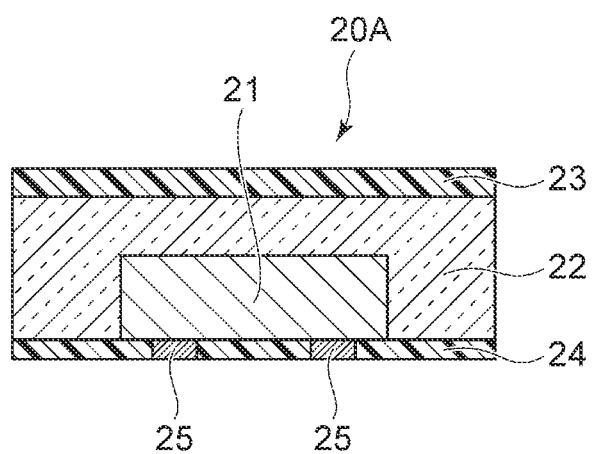
Figure 5:
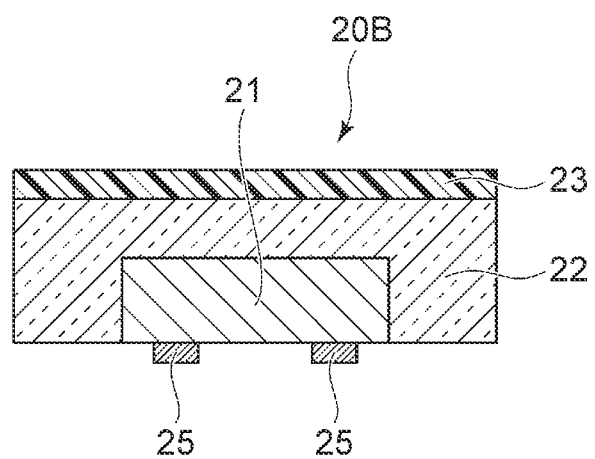
Figure 5:
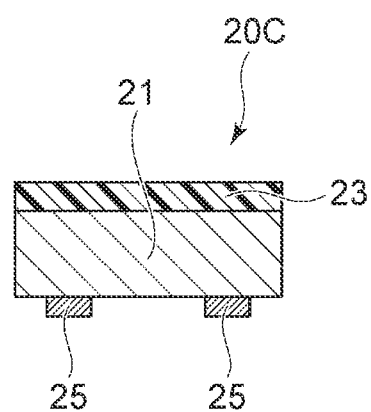

As shown in FIG. 4 to FIG. 5B, the light source 20A can further include a second light transmissive member 22. The second light transmissive member 22 covers the upper face and the lateral faces of the light emitting element 21. The second light transmissive member 22 protects the light emitting element 21 and has a wavelength conversion or light diffusion function in accordance with the particles added to the second light transmissive member 22.

For example, the second light transmissive member 22 includes a light transmissive resin and may further include a phosphor. For the light transmissive resin, for example, a silicone resin or epoxy resin can be used. For the phosphor, for example, yttrium aluminum garnet based phosphors (e.g., $Y_3(Al,Ga)_5O_{12}$:Ce), lutetium aluminum garnet based phosphors (e.g., $Lu_3(Al,Ga)_5O_{12}$:Ce), terbium aluminum garnet based phosphors (e.g., $Tb_3(Al,Ga)_5O_{12}$:Ce), CCA-based phosphors (e.g., $Ca_{10}(PO_4)_6Cl_2$:Eu), SAE-based phosphors (e.g., $Sr_4Al_{14}O_{25}$:Eu), chlorosilicate based phosphors (e.g., $Ca_8MgSi_4O_{16}Cl_2$:Eu), β-SiAlON based phosphors (e.g., $(Si,Al)_3(O,N)_4$:Eu), α-SiAlON based phosphors (e.g., $Ca(Si,Al)_{12}(O,N)_{16}$:Eu), SLA based phosphors (e.g., $SrLiAl_3N_4$:Eu), nitride based phosphors, such as CASN-based phosphors (e.g., $CaAlSiN_3$:Eu), or SCASN-based phosphors (e.g., $(Sr,Ca)AlSiN_3$:Eu), fluoride based phosphors, such as KSF-based phosphors (e.g., $K_2SiF_6$:Mn), KSAF-based phosphors (e.g., $K_2Si_{0.99}Al_{0.01}F_{5.99}$:Mn), or MGF-based phosphors (e.g., $3.5MgO\cdot0.5MgF_2\cdot GeO_2$:Mn), phosphors having a Perovskite structure (e.g., CsPb(F,Cl,Br,I)$_3$), or quantum dot phosphors (e.g., CdSe, InP, AgInS$_2$ or AgInSe$_2$), or the like can be used. For the phosphor added to the second light transmissive member 22, one phosphor may be used, or multiple types of phosphors may be used.

KSAF-based phosphors may have a composition represented by the formula (I) below:

$$M_2[Si_pAl_qMn_rF_s] \quad (I)$$

In the formula (I), M represents an alkali metal, and may include at least K. Mn can be tetravalent Mn ions. P, q, r, and s can satisfy $0.9 \leq p+q+r \leq 1.1$, $0 < q \leq 0.1$, $0 < r \leq 0.2$, and $5.9 \leq s \leq 6.1$, preferably, $0.95 \leq p+q+r \leq 1.05$ or $0.97 \leq p+q+r \leq 1.03$, $0 < q \leq 0.03$, $0.002 \leq q \leq 0.02$ or $0.003 \leq q \leq 0.015$, $0.005 \leq r \leq 0.15$, $0.01 \leq r \leq 0.12$ or $0.015 \leq r \leq 0.1$, $5.92 < s \leq 6.05$ or $5.95 \leq s \leq 6.025$. Examples include the compositions represented by $K_2[Si_{0.946}Al_{0.005}Mn_{0.049}F_{5.995}]$, $K_2[Si_{0.942}Al_{0.008}Mn_{0.050}F_{5.992}]$ and $K_2[Si_{0.939}Al_{0.014}Mn_{0.047}F_{5.986}]$. Such KSAF-based phosphors can emit high luminance red light having a peak emission wavelength with a narrow full width at half maximum.

A wavelength conversion sheet containing any of the phosphors described above may be disposed on the planar light source 1. A wavelength conversion sheet can produce a white light emitting planar light source 1 by absorbing a portion of the blue light from the light source 20A and emitting yellow light, green light, and/or red light. For example, white light can be achieved by combining a blue light emitting light source 20A and a wavelength conversion sheet containing a yellow emitting phosphor. As another example, a blue light emitting light source 20A can be combined with a wavelength conversion sheet containing a red emitting phosphor and a green emitting phosphor. Alternatively, a blue light emitting light source 20A may be combined with a plurality of wavelength conversion sheets. For the wavelength conversion sheets, for example, a wavelength conversion sheet containing a red emitting phosphor and a wavelength conversion sheet containing a green emitting phosphor can be selected. A light source 20A having a blue light emitting light emitting element 21 and a second light transmissive member 22 containing a red emitting phosphor can be combined with a wavelength conversion sheet containing a green emitting phosphor.

For the yellow phosphor used in a wavelength conversion sheet, for example, the yttrium aluminum garnet based phosphors described above is preferably used. For the green phosphor used in a wavelength conversion sheet, a phosphor that emits light having a peak emission wavelength with a narrow full width at half maximum, for example, the phosphors having a Perovskite structure or quantum dot phosphors described above, is preferably used. For the red phosphor used in a wavelength conversion sheet, similar to green phosphors, a phosphor that emits light having a peak emission wavelength with a narrow full width at half maximum, for example, the KSF-based phosphors, KSAF-based phosphors, or quantum dot phosphors described above, is preferably used.

The light source 20A can further include a cover member 24. The cover member 24 is disposed on the lower face of the light emitting element 21. The cover member 24 is disposed such that the lower faces of the electrodes 25 of the light source 20A are exposed from the cover member 24. The cover member 24 is also disposed on the lower face of the second light transmissive member 22 that covers the lateral faces of the light emitting element 21.

The cover member 24 has reflectivity with respect to the light emitted by the light source 20A. The cover member 24 is a resin member containing light scattering particles, for example. For the light scattering particles contained in the cover member 24, for example, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass, or the like can be used. For the resin material for the cover member 24, for example, a thermoplastic resin, such as an acrylic resin, polycarbonate resin, cyclic polyolefin resin, polyethylene terephthalate resin, or polyester resin, or a thermosetting resin, such as an epoxy resin or silicone resin can be used.

Furthermore, the light source 20A may include a first light adjusting member 23. The first light adjusting member 23 is disposed on the upper face of the light source 20A. The first light adjusting member 23 covers the upper face of the light emitting element 21. The first light adjusting member 23 is disposed on the upper face of the second light transmissive member 22 to control the amount and the direction of the light exiting the upper face of the second light transmissive member 22. The first light adjusting member 23 has reflectivity and transmissivity with respect to the emitted light from the light emitting element 21. A portion of the light exiting the upper face of the second light transmissive member 22 is reflected by the first light adjusting member 23, and the other portion transmits through the first light adjusting member 23. The transmittance of the first light adjusting member 23 with respect to the light emitted by the light emitting element 21 is preferably 1% to 50%, for example, more preferably 3% to 30%. This can lower the luminance immediately above the light source 20A to thereby reduce the luminance non-uniformity of the planar light source 1.

The first light adjusting member 23 can be composed of a light transmissive resin and light scattering particles contained in the light transmissive resin. For the resin material, for example, a thermoplastic resin, such as an acrylic resin, polycarbonate resin, cyclic polyolefin resin, polyethylene terephthalate resin, or polyester resin, or a thermosetting resin, such as an epoxy resin or silicone resin can be used. For the light scattering particles, for example, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used. The first light adjusting member 23 may be, for example, a metal material, such as Al or Ag, or a dielectric multilayer film.

The light source does not have to include a cover member 24. For example, the lower face of the light source 20B shown in FIG. 5C includes the lower face of the light emitting element 21 and the lower face of the second light transmissive member 22.

Moreover, as shown in FIG. 5D, a light source 20C can be a light emitting element 21 alone. The first light adjusting member 23 is disposed on the upper face of the light emitting element 21. In FIG. 5D, no cover member 24 is disposed on the lower face of the light emitting element 21 of the light source 20C, but a cover member 24 may be disposed on the lower face of the light emitting element 21.

First Light Transmissive Member

The first light transmissive member 30 is disposed in the light source positioning part 13 of the light guide member 10 between the lateral faces of the light source 20A and the light guide member 10, as well as on the light source 20A. The first light transmissive member 30 covers the upper face and the lateral faces of the light source 20A. The first light transmissive member 30 is preferably in contact with the light guide member 10 and the light source 20A. In this manner, the light from the light source 20A can be readily guided into the light guide member 10.

The first light transmissive member 30 has light transmissivity with respect to the light emitted by the light source 20A. The transmittance of the first light transmissive member 30 with respect to the peak wavelength of the light from the light source 20A is preferably at least 50%, for example, more preferably at least 70%. For the material for the first light transmissive member 30, for example, a resin can be used. For the material for the first light transmissive member 30, for example, the same resin as that for the light guide member 10 or a resin having a small refractive index difference from that of the material for the light guide member 10 can be used.

The first light transmissive member 30 may have a single layer structure or a multilayer structure in the third direction Z. The first light transmissive member 30 may contain a phosphor and/or light scattering particles. In the case in which the first light transmissive member 30 has a multilayer structure, each layer may contain a phosphor and/or light scattering particles, or not. For example, the first light transmissive member 30 may be composed of a layer containing a phosphor and a layer not containing a phosphor.

The first light transmissive member 30 has a first light transmitting part 31 positioned above the first light adjusting member 23 of the light source 20A and a second light transmitting part 32 positioned between the lateral faces of the light source 20A and the light guide member 10.

Second Light Adjusting Member

The second light adjusting member 40 is disposed on the first light transmissive member 30. As shown in FIG. 1, the second light adjusting member 40 is disposed to overlap the light source positioning part 13 in which the light source 20A and the first light transmissive member 30 are disposed in a plan view.

The second light adjusting member 40 has reflectivity and transmissivity with respect to the light emitted by the light source 20A. The transmittance of the second light adjusting member 40 with respect to the peak wavelength of the light from the light source 20A is preferably 1% to 50%, for example, more preferably 3% to 30%.

The second light adjusting member 40 can be composed of a light transmissive resin and light scattering particles contained in the light transmissive resin. For the light transmissive resin material, for example, a thermoplastic resin, such as an acrylic resin, polycarbonate resin, cyclic polyolefin resin, polyethylene terephthalate resin, or polyester resin, or a thermosetting resin, such as an epoxy resin or silicone resin can be used. For the light scattering particles, for example, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used. The second light adjusting member 40 may be, for example, a metal material, such as aluminum or silver, or a dielectric multilayer film.

The upper face 40a of the second light adjusting member 40, together with the first upper face 11 of the light guide member 10, functions as the emission face (light exiting face) of the planar light source 1. The second light adjusting member 40 reflects a portion of the light advancing upwards in the light source positioning part 13 where the light source 20A is disposed while transmitting the other portion. This can reduce the difference between the luminance directly above the light source 20A and its vicinity and the luminance of the other region in the emission face of the planar light source 1, thereby reducing the luminance non-uniformity in the emission face of the planar light source 1.

The first light transmitting part 31 of the first light transmissive member 30 is located between the second light adjusting member 40 and the first light adjusting member 23 of the light source 20A. The first light transmissive member 30 has a higher transmittance with respect to the emitted light from the light source 20A than the transmittance of the first light adjusting member 23 and the transmittance of the second light adjusting member 40. The transmittance of the first light transmissive member 30 with respect to the light from the light source 20A can be set as 2 to 100 times the transmittance of the first light adjusting member 23 and the transmittance of the second light adjusting member 40 within the range of up to 100%. The light exiting the lateral faces of the light source 20A and the light reflected by the light reflecting sheet 53 comes around and enters the first light transmitting part 31 located between the second light adjusting member 40 and the first light adjusting member 23. This can prevent the luminance in the area directly above the light source 20A from becoming too high or too low. As a result, luminance non-uniformity in the emission face of the planar light source 1 can be reduced.

Because the transmission of a portion of the light exiting the light source 20A directly upward is reduced by the first light adjusting member 23, the transmittance of the second light adjusting member 40 is preferably higher than the transmittance of the first light adjusting member 23 with respect to the light emitted by the light source 20A to prevent the luminance of the region directly above the light source 20A from becoming too low.

Support Member

The support member 50 has an insulation base 60, a first conductive layer 81, a first adhesive layer 51, and a light reflecting sheet 53.

The insulation base 60 has a first face 61 positioned closer to the light source 20A and a second face 62 positioned opposite the first face 61. The insulation base 60 is preferably a highly flexible material, but may be a highly rigid material. For the material for the insulation base 60, for example, a resin, such as polyester or polyimide, or glass epoxy can be used. Examples of polyesters include polyethylene terephthalate and polyethylene naphthalate.

The first conductive layer 81 is disposed on the first face 61 of the insulation base 60 and electrically connected to the light source 20A. The first conductive layer 81 is a metal layer which includes no resin. For example, the first conductive layer 81 is a copper layer. The first conductive layer 81 can be an aluminum layer, nickel layer, silver layer, or gold layer besides a copper layer.

The first adhesive layer 51 is disposed between the first face 61 of the insulation base 60 and the light reflecting sheet 53, adhering the insulation base 60 and the light reflecting sheet 53. The first adhesive layer 51 is disposed on the first face 61 of the insulation base 60 and the first conductive layer 81 and in contact with the first face 61 of the insulation base 60 and the first conductive layer 81. The first adhesive layer 51 also serves as a protective layer covering the first conductive layer 81, and no layer is disposed between the first adhesive layer 51 and the first face 61 of the insulation base 60 or between the first adhesive layer 51 and the first conductive layer 81. The first adhesive layer 51 is in contact with the first face 61 of the insulation base 60 and the first conductive layer 81. This can reduce the thickness of the support member 50, which as a result can reduce the thickness of the planar light source 1. The first conductive layer 81 is embedded in the first adhesive layer 51. This can further reduce the thicknesses of the support member 50 and the planar light source 1. The first adhesive layer 51 is in contact with the light reflecting sheet 53. This can also reduce the thicknesses of the support member 50 and the planar light source 1.

The first adhesive layer 51 is a resin layer. For the resin for the first adhesive layer 51, for example, an epoxy resin, acrylic resin, or cyclic polyolefin resin can be used. The first adhesive layer 51 can contain light scattering particles in the resin. For the light scattering particles, for example, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used.

The light reflecting sheet 53 is disposed under the first face 12 of the light guide member 10, under the light source 20A, under the first light transmissive member 30, and under the grooves 14. The light reflecting sheet 53 has reflectivity with respect to the light emitted by the light source 20A. For the light reflecting sheet 53, for example, a resin sheet containing a large number of air bubbles or a resin sheet containing light scattering particles can be used. For the resin for the light reflecting sheet 53, for example, a polyethylene terephthalate (PET) resin, cyclic polyolefin resin, acrylic resin, silicone resin, urethane resin, or epoxy resin can be used. For the light scattering particles, for example, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used.

The light from the light source 20A is guided through the light guide member 10 between the upper face 11 of the guide member 10 and the light reflecting sheet 53 towards the grooves 14 while being repeatedly reflected by the light reflecting sheet 53 and the upper face 11. A portion of the light advancing towards the first upper face 11 is extracted to the outside from the first upper face 11 of the light guide member 10. A portion of the light that advanced towards the first lower face 12 is reflected by the light reflecting sheet 53 towards the first upper face 11 side, and thus the luminance of the light extracted from the first upper face 11 can be increased.

In the case in which the first adhesive layer 51 disposed under the light reflecting sheet 53 contains light scattering particles as described above, the luminance of the light extracted from the first upper face 11 can be further increased.

The support member 50 can further include a second adhesive layer 52. The second adhesive layer 52 is disposed between the light reflecting sheet 53 and the first lower face 12 of the light guide member 10, adhering the light reflecting sheet 53 and the light guide member 10. The light source 20A is disposed on the second adhesive layer 52 in the light source positioning part 13 of the light guide member 10. The second adhesive layer 52 has light transmissivity with respect to the light emitted by the light source 20A. For the material for the second adhesive layer 52, for example, an epoxy resin, acrylic resin, or cyclic polyolefin resin can be used.

The support member 50 can further include a first connection part 70. The first connection part 70 includes a first portion 71 and a second portion 72. The first portion 71 is disposed in a second hole h2 that passes through the second adhesive layer 52, the light reflecting sheet 53, the first adhesive layer 51, and the insulation base 60 in the third direction Z, and located under the light source 20A. The second portion 72 is disposed on the second face 62 of the insulation base 60 and connected to the first portion 71.

The first portion 71 and the second portion 72 are preferably formed monolithically using the same material. The first portion 71 and the second portion 72 may be made of different materials. The first connection part 70 includes, for example, a resin and conductive particles contained in the resin. For the resin for the first connection part 70, for example, an epoxy resin, urethane resin, or phenol resin can be used. For the conductive particles, for example, particles of a metal, such as copper, silver, nickel, or gold can be used. For the conductive particles, particles of a carbon material may be used.

A pair of first connection parts 70 are spaced apart in correspondence with the pair of positive and negative electrodes 25 of the light source 20A. One of the first portions 71 of the first connection parts 70 is connected to the positive electrode 25 under the light source 20A, and the other first portion 71 of the first connection parts 70 is connected to the negative electrode 25 under the light source 20A.

A portion 72a of a second portion 72 passes through the insulation substrate 60 and is connected to the first conductive layer 81. Accordingly, the electrodes 25 of the light source 20A are electrically connected to the first conductive layer 81 via the first connection parts 70.

The first conductive layer 81 is a metal layer which includes no resin, and has lower resistance than a conductive layer which includes a resin. Thus, the first conductive layer 81 can be formed thinner than a conductive layer which includes a resin. The first conductive layer 81 generates a smaller amount of heat than a conductive layer that includes a resin thereby reducing the degradation of the first adhesive layer 51 in contact with the first conductive layer 81. According to the First Embodiment, the thicknesses of the support member 50 and the planar light source 1 can be reduced as compared to the case in which both the first conductive layer 81 and the first connection parts 70 are composed of a resin.

The support member 50 can further include a protective layer 54. The protective layer 54 is disposed on the second face 62 of the insulation base 60 to directly cover and protect the first connection parts 70. For the material for the protective layer 54, for example, a urethane resin, acrylic resin, phenol resin, polyolefin resin, or epoxy resin can be used.

Figure 2:
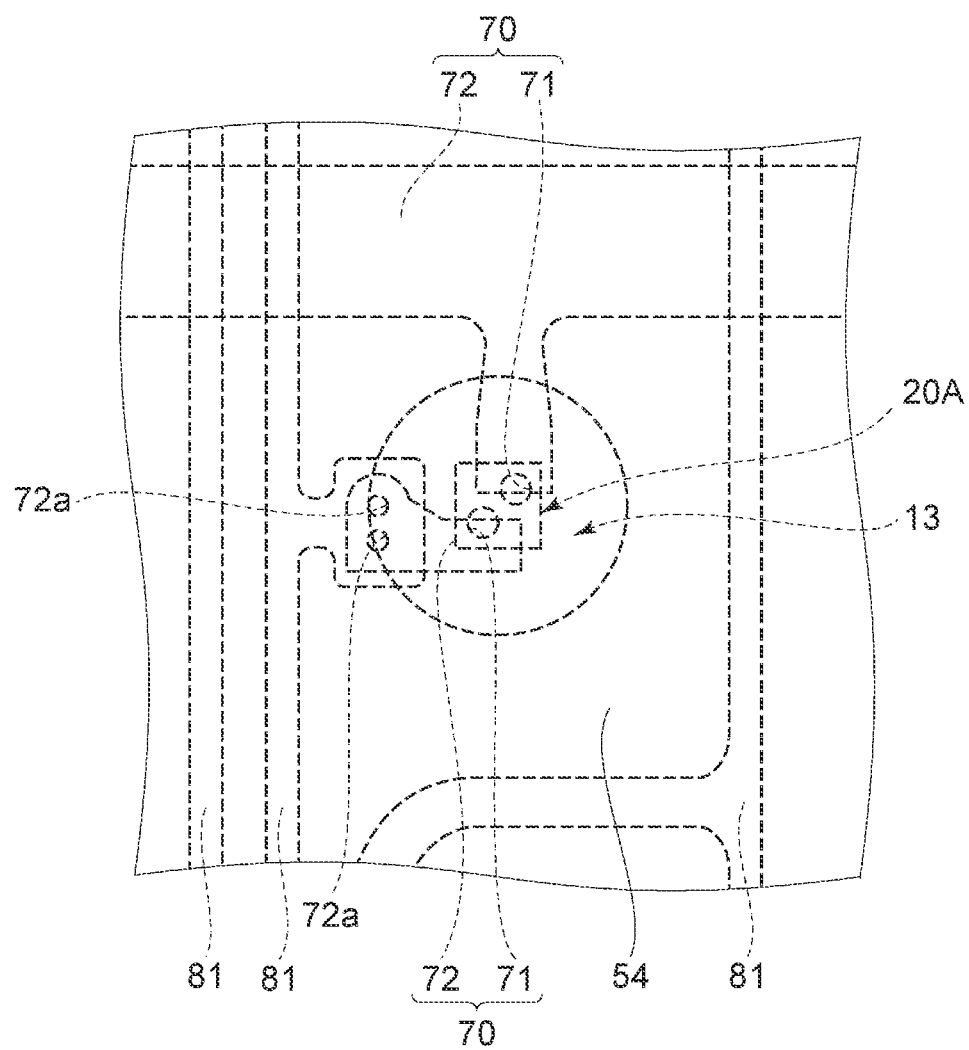
FIG. 2 is a bottom view showing a light source positioning part and the peripheral area in the planar light source according to the First Embodiment.

As shown in FIG. 2, in a plan view, at least a portion of the first conductive layer 81 overlaps the light source positioning part 13. In a plan view, at least some portions of the first connection parts 70 overlap the light source positioning part 13. This allows the first conductive layer 81 and the first connection parts 70 to suppress the light downwardly exiting the light source positioning part, thereby increasing the luminance of the light extracted from the upper face 11.

Second Embodiment

Figure 6:
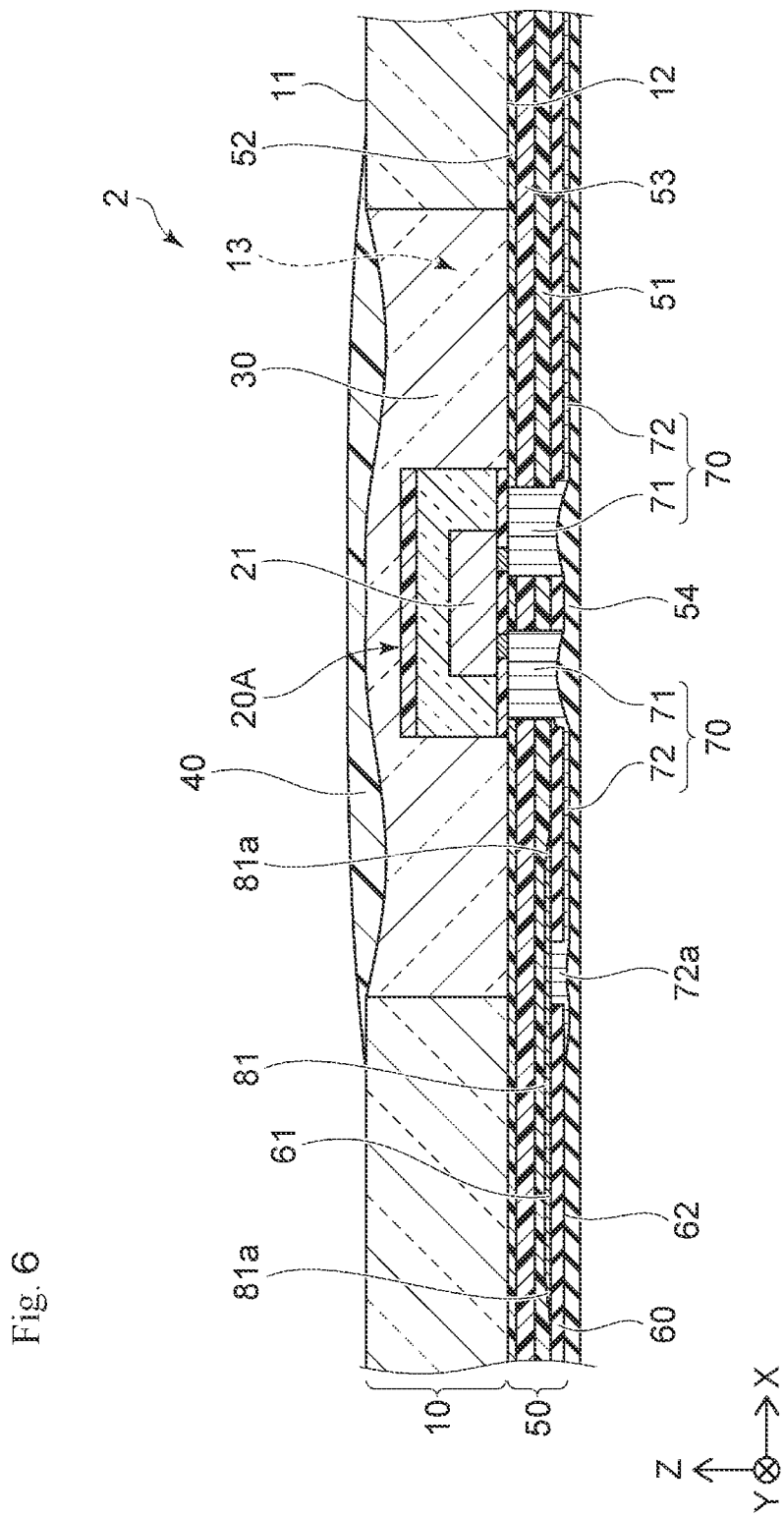
FIG. 6 is a cross-sectional view of a planar light source according to a Second Embodiment.

FIG. 6 is a cross-sectional view of a planar light source 2 according to a Second Embodiment showing the portion that includes a light source positioning part 13.

The first conductive layer 81 in the planar light source 2 according to the Second Embodiment includes a resin and conductive particles contained in the resin. For the resin for the first conductive layer 81, for example, an epoxy resin, urethane resin, or phenol resin can be used. For the conductive particles, for example, particles of a metal, such as copper, silver, nickel, or gold can be used. For the conductive particles, those formed of a carbon material may be used. Because the first conductive layer 81 includes a resin, the adhesion between the first conductive layer 81 and the first adhesive layer 51 can be enhanced.

Furthermore, the first conductive layer 81 has an end portion 81a whose thickness decreases as being closer to the end of the first conductive layer. The directions in which the first conductive layer 81 extends include the first direction X and the second direction Y. The lower face of the end portion 81a is in contact with the first face 61 of the insulation base 60. The first adhesive layer 51 covers the upper face of the end portion 81a. The upper face of the end portion 81a is a curved face or oblique face oblique to the first face 61 of the insulation base 60. This can enhance the adhesion to the first adhesive layer 51. The end portion 81a is the portion of up to 50 μm from the edge of the first conductive layer 81, for example.

Third Embodiment

Figure 7:
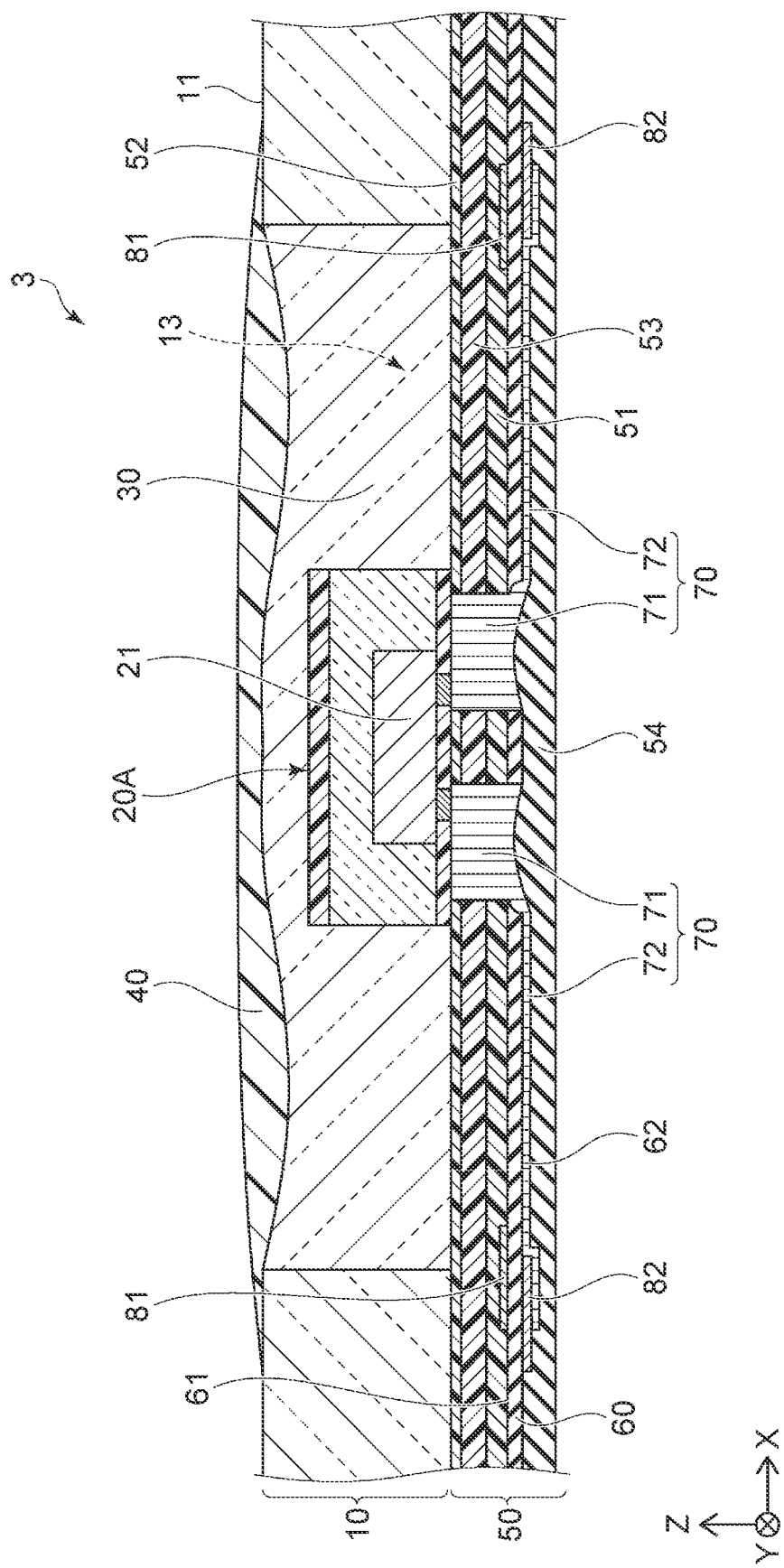
FIG. 7 is a cross-sectional view of a planar light source according to a Third Embodiment.

FIG. 7 is a cross-sectional view of a planar light source 3 according to a Third Embodiment showing the portion that includes a light source positioning part 13.

The support member 50 in the planar light source 3 according to the Third Embodiment further has a second conductive layer 82 disposed on the second face 62 of the insulation base 60. The second conductive layer 82 is connected to the second portions 72 of the first connection parts 70 on the second face 62 of the insulation base 60. For example, the second conductive layer 82 is covered by the second portions 72 in part. The second conductive layer 82 is a metal layer which includes substantially no resin, for which the same material as that for the first conductive layer 81 can be used.

The first conductive layer 81 disposed on the first face 61 of the insulation base 60 is electrically connected to the conductive members disposed on the second face 62 of the insulation base 60, i.e., the second conductive layer 82 and the second portions 72 of the first connection parts 70. Among the conductive members disposed on the second face 62, the second portions 72 of the first connection parts 70 contain a resin that can enhance the adhesion to the protective layer 54, and the second conductive layer 82 contains substantially no resin and thus can reduce resistance. This can reduce the resistance of the conductive members disposed on the second face 62 while enhancing the adhesion to the protective layer 54.

Figure 8:
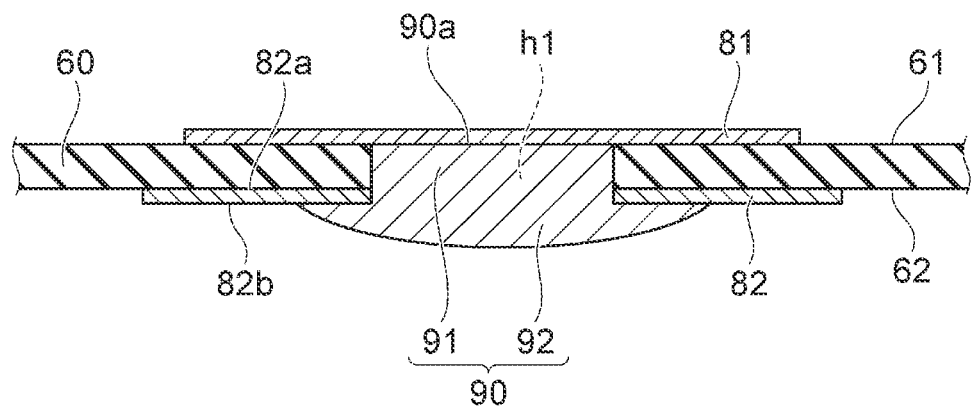
FIG. 8A is a cross-sectional view of a second connection part in the planar light source of the Third Embodiment.
FIG. 8B is a cross-sectional view of a variation of the second connection part in the planar light source of the Third Embodiment.
Figure 8:
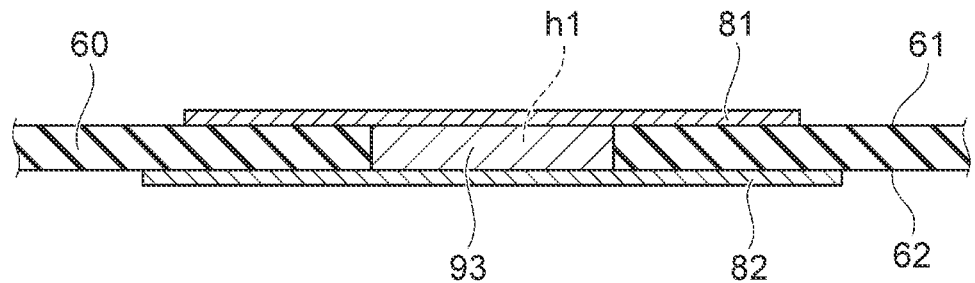

FIG. 8A is a cross-sectional view illustrating an example of a connection part between the second conductive layer 82 and the first conductive layer 81.

The support member 50 of the Third Embodiment further includes a first hole h1 that passes through at least the insulation base 60, and a second connection part 90 disposed in the first hole h1 to electrically connect the first conductive layer 81 and the second conductive layer 82. In this embodiment, the first hole h1 is located distant from what is shown in the cross section in FIG. 7. The second connection part 90 includes a resin and conductive particles contained in the resin. For the resin for the second connection part 90, for example, an epoxy resin, urethane resin, or phenol resin can be used. For the conductive particles, particles of a metal, such as copper, silver, nickel, or gold can be used. For the conductive particles, those formed of a carbon material may be used.

In the example shown in FIG. 8A, the first hole h1 also passes through the second conductive layer 82. The second connection part 90 has a first portion 91 and a second portion 92. The first portion 91 is disposed in the first hole h1. The second portion 92 is disposed on the second lower face 82b of the second conductive layer 82 positioned opposite the second upper face 82a that is in contact with the second face 62 of the insulation base 60. The second portion 92 of the second connection part 90 is in contact with the second lower face 82b of the second conductive layer 82 in the periphery of the first hole h1.

A first hole h1 that passes through the insulation base 60 and the second conductive layer 82 can be formed by drilling, punching, laser irradiation, or the like, in the state in which the second conductive layer 82 is disposed on the second face 62 of the insulation base 60 but no first conductive layer 81 disposed on the first face 61 of the insulation base 60. After forming a first hole h1, a conductive paste is supplied into the first hole h1, followed by further supplying the conductive paste onto the second lower face 82b of the second conductive layer 82 in the periphery of the first hole h1. A second connection part 90 is formed by hardening the conductive paste. After forming a second connection part 90, the first conductive layer 81 is formed on the first face 61 of the insulation base 60 to be in contact with the surface 90a of the second connection part 90 exposed at the first hole h1.

The second connection part 90 is in contact with not only the inner surface of the second conductive layer 82 in the first hole h1, but also the lower face 82b of the second conductive layer 82. This, in other words, can make the contact area between the second connection part 90 and the second conductive layer 82 larger than the contact area between the second connection part 90 and the first conductive layer 81, thereby reducing the contact resistance between the second connection part 90 and the second conductive layer 82.

FIG. 8B is a cross-sectional view of another example of a connection part between the second conductive layer 82 and the first conductive layer 81. The first hole h1 is formed by irradiating a laser from the first face 61 side in the state in which the second conductive layer 82 is disposed on the second face 62 of the insulation base 60 but no first conductive layer 81 disposed on the first face 61 of the insulation base 60. The first hole h1 passes through the insulation base 60, but does not pass through the second conductive layer 82. Subsequently, a conductive paste is supplied into the first hole and the conductive paste is hardened. This forms a second connection part 93 that connects the first conductive layer 81 and the second conductive layer 82.

Fourth Embodiment

Figure 9:
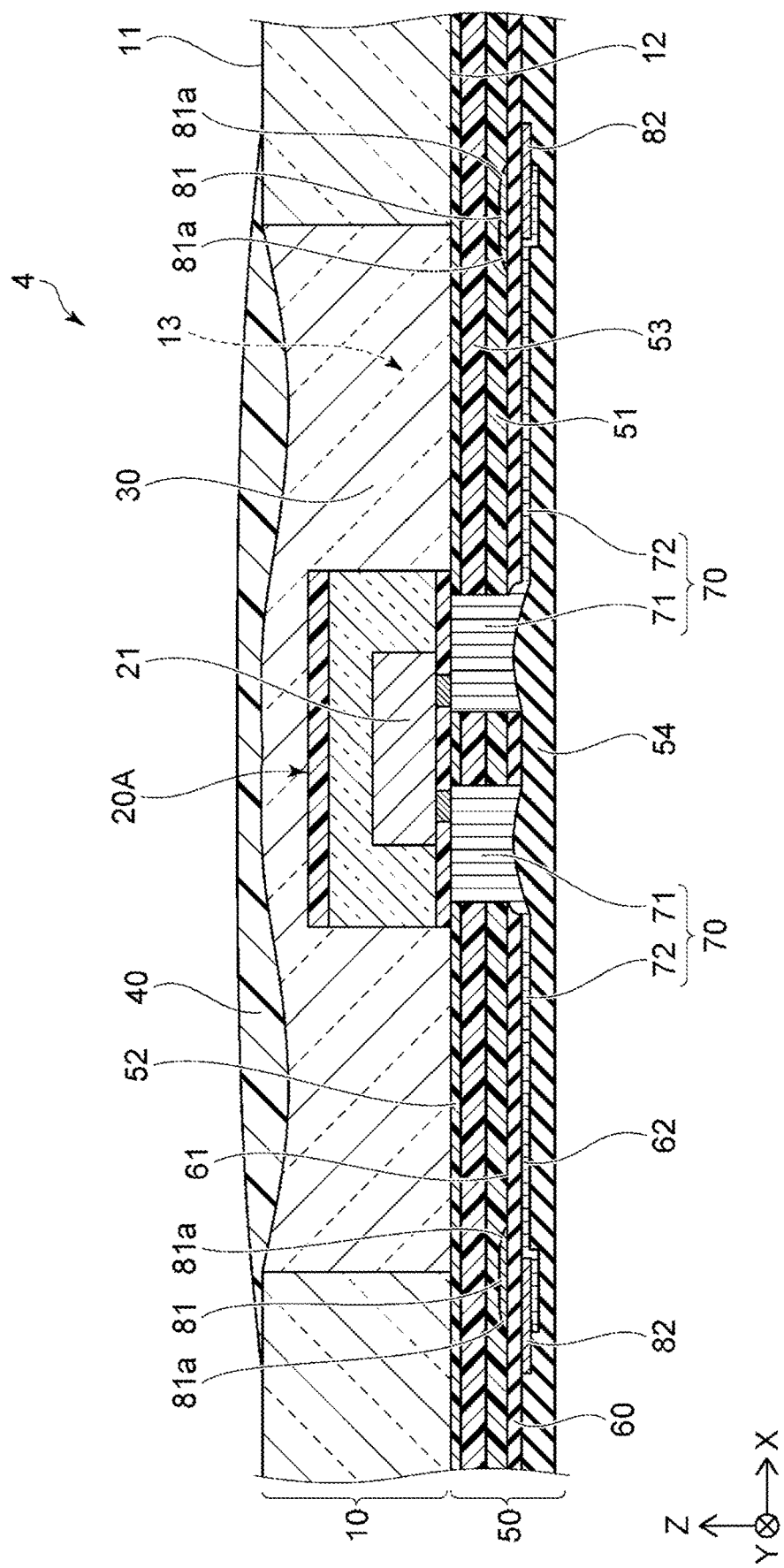
FIG. 9 is a cross-sectional view of a planar light source according to a Fourth Embodiment.

FIG. 9 is a cross-sectional view of a planar light source 4 according to a Fourth Embodiment showing the portion that includes a light source positioning part 13.

The planar light source 4 in the Fourth Embodiment, similar to the planar light source 3 in the Third Embodiment, has a second conductive layer 82 disposed on the second face 62 of the insulation base 60. The first conductive layer 81 and the second conductive layer 82 are electrically connected by the second connection part 90 shown in FIG. 8A or the second connection part 93 shown in FIG. 8B.

The first conductive layer 81 in the Fourth Embodiment, similar to the Second Embodiment, includes a resin and conductive particles contained in the resin. Furthermore, the first conductive layer 81 has an end portion 81 whose thickness decreases as being closer to the end of the first conductive layer. The lower face of the end portion 81a is in contact with the first face 61 of the insulation base 60. The first adhesive layer 51 covers the upper face of the end portion 81a. The upper face of the end portions 81a is a curved face or oblique face oblique to the first face 61 of the insulation base 60. This can enhance the adhesion to the first adhesive layer 51.

In the foregoing, certain embodiments of the present invention have been explained. The present invention, however, is not limited to these specific examples. All forms implementable by a person skilled in the art by suitably making design changes based on any of the embodiments of the present disclosure described above also fall within the scope of the present invention so long as they encompass the subject matter of the present invention. Furthermore, various modifications and alterations within the spirit of the present invention that could have been made by a person skilled in the art also fall within the scope of the present invention.

What is claimed is:

1. A planar light source comprising:
a support member;
a light guide member disposed on the support member and having a light source positioning part; and
a light source disposed on the support member while being in the light source positioning part of the light guide member; wherein
the support member comprises:
an insulation base having a first face positioned closer to the light source and a second face positioned opposite the first face,
a first conductive layer disposed on the first face of the insulation base and electrically connected to the light source,
an adhesive layer disposed on and in contact with the first face of the insulation base and the first conductive layer,
a light reflecting sheet disposed on the adhesive layer,
a second conductive layer disposed on the second face of the insulation base and electrically connected to the first conductive layer, the second conductive layer being a metal layer that includes substantially no resin,
a hole positioned under the light source and passing through the light reflecting sheet, the adhesive layer, and the insulation base,
a first connection part disposed in the hole and on the second face of the insulation base, and connected to the second conductive layer, the first connection part comprising a resin and conductive particles, and
a protective layer comprising a resin, and directly covering the second conductive layer and the first connection part.

2. The planar light source according to claim 1, wherein the adhesive layer is in contact with the light reflecting sheet and contains light scattering particles.

3. The planar light source according to claim 1, wherein the first conductive layer overlaps the light source positioning part in a plan view.

4. The planar light source according to claim 1, wherein the first conductive layer comprises a resin and conductive particles.

5. The planar light source according to claim 4, wherein the first conductive layer comprises an end portion whose thickness decreases in a direction towards an end of the first conductive layer, and the end portion is in contact with the insulation base.

6. The planar light source according to claim 1, wherein the first conductive layer is a metal layer that includes substantially no resin.

7. The planar light source according to claim 1, wherein:
the support member further comprises:
an additional hole passing through at least the insulation base, and
a second connection part disposed in the additional hole, and electrically connecting the first conductive layer and the second conductive layer.

8. The planar light source according to claim 7, wherein:
the first additional hole further passes through the second conductive layer;
the second conductive layer has a first face in contact with the second face of the insulation base and a second face opposite the first face;
the second connection part is disposed on the second face of the second conductive layer; and a contact area between the second connection part and the second conductive layer is larger than a contact area between the second connection part and the first conductive layer.

9. The planar light source according to claim 7, wherein the second connection part comprises a resin and conductive particles.

10. The planar light source according to claim 1, wherein a lateral face of the light source is exposed from the light reflecting sheet.

11. The planar light source according to claim 1, further comprising a second adhesive layer disposed between the light reflecting sheet and the light source.

12. The planar light source according to claim 1, wherein:
the first conductive layer has a first face positioned closer to the light source and a second face opposite the first face; and
the adhesive layer is disposed on and in contact with the first face of the first conductive layer.

13. A planar light source comprising:
a support member;
a light guide member disposed on the support member and having a light source positioning part; and
a light source disposed on the support member while being in the light source positioning part of the light guide member; wherein
the support member comprises:
an insulation base having a first face positioned closer to the light source and a second face positioned opposite the first face,
a first conductive layer disposed on the first face of the insulation base and electrically connected to the light source,
an adhesive layer disposed on and in contact with the first face of the insulation base and the first conductive layer,
a light reflecting sheet disposed on the adhesive layer,
a second conductive layer disposed on the second face of the insulation base and electrically connected to the first conductive layer, the second conductive layer has a first face in contact with the second face of the insulation base and a second face opposite the first face, the second conductive layer being a metal layer that includes substantially no resin,
a first connection part comprises a resin and conductive particles, disposed on the second face, and connected to the second conductive layer,
a protective layer comprising a resin, and directly covering the second conductive layer and the first connection part,
a hole passing through the insulation base and the second conductive layer, and
a second connection part disposed in the hole and on the second face of the second conductive layer, and electrically connecting the first conductive layer and the second conductive layer, wherein:
a contact area between the second connection part and the second conductive layer is larger than a contact area between the second connection part and the first conductive layer.

14. The planar light source according to claim 13, wherein the adhesive layer is in contact with the light reflecting sheet and contains light scattering particles.

15. The planar light source according to claim 13, wherein the first conductive layer overlaps the light source positioning part in a plan view.

16. The planar light source according to claim 13, wherein the first conductive layer comprises a resin and conductive particles.

17. The planar light source according to claim 16, wherein the first conductive layer comprises an end portion whose thickness decreases in a direction towards an end of the first conductive layer, and the end portion is in contact with the insulation base.

18. The planar light source according to claim 13, wherein the first conductive layer is a metal layer that includes substantially no resin.

19. The planar light source according to claim 16, wherein:
the second conductive layer is a metal layer that includes substantially no resin; and
the support member further comprises:
a first connection part comprises a resin and conductive particles, disposed on the second face, and connected to the second conductive layer; and
a protective layer comprising a resin, and directly covering the second conductive layer and the first connection part.

20. The planar light source according to claim 13, wherein the second connection part comprises a resin and conductive particles.

* * * * *

UNITED STATES PATENT AND TRADEMARK OFFICE
CERTIFICATE OF CORRECTION

PATENT NO. : 11,934,003 B2
APPLICATION NO. : 17/872598
DATED : March 19, 2024
INVENTOR(S) : Yukihiro Miura et al.

It is certified that error appears in the above-identified patent and that said Letters Patent is hereby corrected as shown below:

In the Claims

Claim 8, Column 14, Lines 61-62:
Please delete:
"the first additional hole further passes through the second conductive layer;"
Please replace with:
"the additional hole further passes through the second conductive layer;"

Signed and Sealed this
Twenty-fifth Day of June, 2024

Katherine Kelly Vidal
*Director of the United States Patent and Trademark Office*